EXAMINER
232

455/6

395/143

May 7, 1968 H. N. FRIHART 3,382,439

RADIO SIGNAL DISTRIBUTION SYSTEM

Filed Sept. 9, 1964 2 Sheets-Sheet 1

Inventor
HENRY NEIL FRIHART
BY
Mueller & Aichele
ATTYS.

May 7, 1968 H. N. FRIHART 3,382,439

RADIO SIGNAL DISTRIBUTION SYSTEM

Filed Sept. 9, 1964 2 Sheets-Sheet 2

Inventor
HENRY NEIL FRIHART
BY
Mueller & Aichele
ATTYS.

United States Patent Office 3,382,439
Patented May 7, 1968

3,382,439

RADIO SIGNAL DISTRIBUTION SYSTEM

Henry Neil Frihart, La Grange Park, Ill., assignor to Motorola, Inc., Franklin Park, Ill., a corporation of Illinois Filed Sept. 9, 1964, Ser. No. 395,143
9 Claims. (Cl. 325—308)

ABSTRACT OF THE DISCLOSURE

A radio signal distribution system particularly adapted for use in a vehicle uses a single antenna and tuned distribution amplifier to receive radio signals and a single cable to distribute the radio signals to a plurality of receivers. The single cable also acts to distribute the power required by each of the individual receivers. The individual receivers are separately tunable and have transducers for developing sound signals in response to the radio signals. The transducers are such that the sound signals produced thereby are inaudible a very short distance from the transducer so that the sound signal therefrom will not disturb passengers in the vehicle. Sound tube earphones are connected to each of the transducers to convey the sound signal to individual listeners as desired.

In order to provide improved service for passengers of commercial vehicles making extended trips, it is desirable to provide radio entertainment. Previous attempts to provide this entertainment have met with failure or limited acceptance because the choice of programs was very limited or completely out of control of the passenger. The program or station selection was made by vehicle personnel who had little time or interest in maintaining a high level of entertainment value in the radio service. Unless the radio service is provided to each passenger by a restrictive device such as earphones, passengers who do not wish to listen to the radio entertainment would be a captive audience and thus the entertainment value for them would be a negative one. While providing the radio service over earphones eliminates the problem of a captive audience, the earphones would be costly and subject to loss and thus make the cost of providing the radio entertainment service expensive. In addition, the use of the same earphones by many different passengers presents a problem in sanitation.

Since the fares charged by competing transportation services are usually held to a minimum in order to attract passengers, it would be desirable to charge a small fee for the entertainment service provided. By providing the entertainment service by means of an inexpensive system, the fee charge can be made small enough to be attractive to the passenger, while at the same time providing sufficient income to pay for the cost of the service.

It is therefore an object of this invention to provide an improved radio entertainment service for vehicles carrying a large number of passengers.

Another object of this invention is to provide a radio entertainment service for a passenger vehicle in which each passenger has a personal radio receiver which he can control as he desires.

Another object of this invention is to provide a radio entertainment service for passenger vehicle in which each passenger can hear only the radio under his control.

Another object of this invention is to provide a radio entertainment service for a passenger vehicle in which the equipment used by each passenger is maintained in a sanitary condition.

Another object of this invention is to provide a radio entertainment service for a passenger vehicle with a simplified means of charging for the radio service.

Another object of this invention is to provide a radio entertainment service for a passenger vehicle in which the radio receivers used in the system do not create mutual interference.

Another object of this invention is to provide a radio entertainment service for a passenger vehicle which can be easily installed in existing vehicles.

Another object of this invention is to provide a radio entertainment service for a passenger vehicle which requires a minimum amount of power.

A feature of this invention is the provision of a radio entertainment system for a passenger vehicle having an individual radio receiver for each passenger in the vehicle.

Another feature of this invention is the provision of a radio entertainment system for a passenger vehicle in which each radio receiver can be tuned throughout the broadcast band so that a passenger can select the station he desires and wherein the passenger can control the volume.

Another feature of this invention is the provision of a radio entertainment system for a passenger vehicle with a broad band aperiodic amplifier and filter system which selects and amplifiers a particular band of frequencies.

Another feature of this invention is the provision of a radio entertainment system for a passenger vehicle having cables coupling aperiodic amplifier to the individual radios and in which input impedance of the radios is different from the impedance of the cables to create a mismatch therebetween, to minimize mutual interference between the radio receivers.

Another feature of this invention is the provision of a radio entertainment system for a passenger vehicle with isolation chokes in the distribution amplifier and the individual radios whereby power for operation of the radios is coupled to the same cables distributing the radio signals and transmitted to the radio receivers to provide power therefor.

Another feature of this invention is the provision of a radio entertainment system for a passenger vehicle wherein individual radio receivers are designed to be mounted in overhead luggage racks for installation in existing vehicles.

Another feature of this invention is the provision of a radio entertainment system for a passenger vehicle in which expensive air tube earphones, connected to and driven by a transducer in the radio receiver, are used by the passenger to listen to the radio.

The invention is illustrated in the drawings in which.

Figures 1, 7:
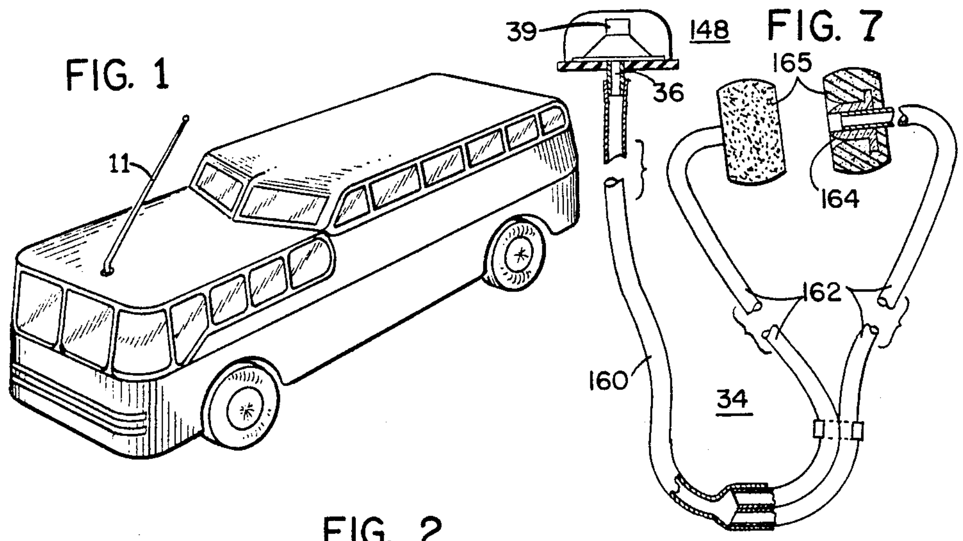
FIG. 1 is an illustration of a bus showing the system antenna location.
FIG. 7 is a view of sound tube earphones which can be used in this system.

In practicing this invention a radio receiving system for a passenger vehicle is provided. The receiving system includes an antenna mounted on the vehicle for receiving radio signals. A distribution amplifier is coupled to the antenna and includes a filter circuit for selecting a particular frequency band of radio signals, in this example the standard AM broadcast band. Located throughout the passenger vehicle, preferably at each seat occupied by a passenger, are radio receivers. The receiver is a standard radio receiver having tuning and volume controls. Thus, the passenger can select any station in the broadcast band he desires and can control the volume of that station to his satisfaction.

The distribution amplifier includes several amplifying circuits for coupling the band of radio signals to a plurality of transmission lines which in turn distribute the signals to the individual radio receivers. By using a plurality of cables the number of receivers on each transmission line is limited thereby minimizing interference between the individual receivers. Mutual interference between the receiver is further minimized by utilizing tuned radio frequency stages in the receiver and by means of an impedance mismatch between the distribution cables and the radio receivers.

The power supplied through the distribution amplifier is coupled to each of the transmission lines by means of chokes so that current for operation of the individual radio receivers can be provided by the same cables distributing the radio frequency signals. At each of the individual radio receivers the power supply circuit of the receiver is coupled to the transmission line through a choke which permits the power supply current to enter the power supply circuits while blocking the radio frequency signals.

To provide listening privacy for a passenger desiring to use the radio entertainment service and to prevent the remaining passengers from becoming a captive audience, a simple sound tube earphone is used. The sound tube earphone is connected to a transducer located in the radio receiver and couples the sound from the transducer to the individual passenger. The sound tube earphones can be manufactured of inexpensive material and can be sold to the passenger at a price which will include the cost of providing the radio service. Since the earphone is very inexpensive it can be discarded, thereby avoiding the problem of sanitation.

The radio receivers provided are sufficiently small that they may be mounted in overhead luggage racks which are found in most vehicles used in passenger service today. The receivers protrude through the luggage rack so that the operating surface is located above the seat occupied by the passenger. The use of transistors enables a system having a large number of receivers to be operated with a minimum power drain on the existing electrical system of the vehicle.

As an example of this system, a radio entertainment system for use in a bus is described. However, this radio entertainment is not restricted to this form of transportation and may be used in other transportation systems, such as a train, airplane, ship or boat.

Figure 2:
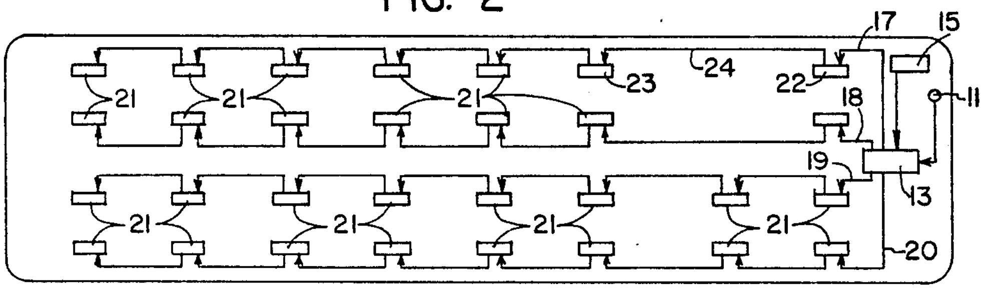
FIG. 2 is a plan view of the inside of the bus of FIG. 1 showing the location of the system components.

FIGS. 1 and 2 illustrate the radio entertainment system installed in a bus. An antenna 11 mounted on the top of the bus receives radio signals which are coupled to distribution amplifier 13. A control box 15 located adjacent the bus operator's seat provides the necessary controls for the radio system. In this system it is only necessary for the bus driver to turn on the system and no further attention is required by him. Cables 17, 18, 19 and 20 couple the distribution amplifier 13 to radio receivers 21, 22 and 23 located throughout the bus. Cables 17, 18, 19 and 20 also carry the power supply for the individual radio receivers.

As will be shown subsequently each receiver input connection is coupled directly to an output connection. Thus, the radio signals and power can be coupled from receiver to receiver without the use of special connectors. In the example of FIG. 2 cable 17 is coupled to the input connector of receiver 22, and the output connector of receiver 22 is coupled to the input connector of receiver 23 by cable 24. Thus, each receiver in the system can be coupled to a receiver located ahead of it and behind it in the bus. This system provides for installation of different numbers of receivers without the use of special cables for each installation.

Figure 3:
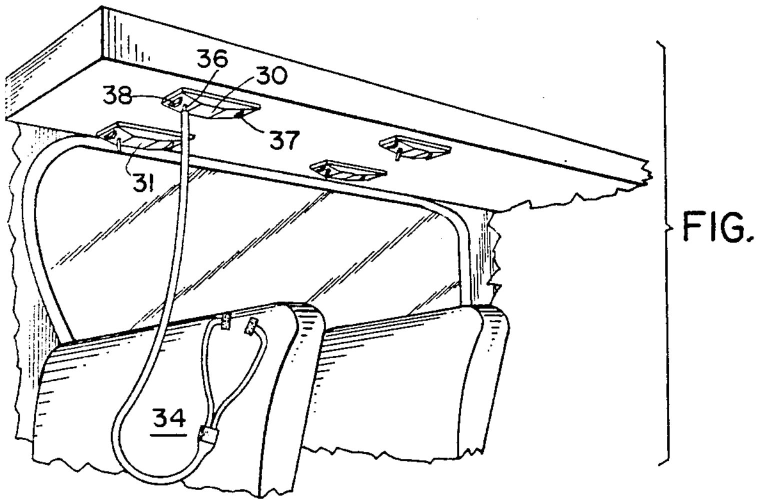
FIG. 3 illustrates the location of the receivers with relation to the passenger seats.

FIG. 3 illustrates the positioning of the receivers at individual seats in the bus with the receivers 30 and 31 located in the luggage rack overhead. The listener hears the sound from the receivers through the sound tube earphones 34, which are plugged into sound coupler 36. Sound coupler 36 is coupled to a transducer which is located inside the receiver and acts to limit the dispersion of sound from the transducer so that it is inaudible to persons in the bus except through the earphones 34. The station desired is selected by means of tuning knob 37 and volume is controlled by means of volume control knob 38.

Figures 4, 5:
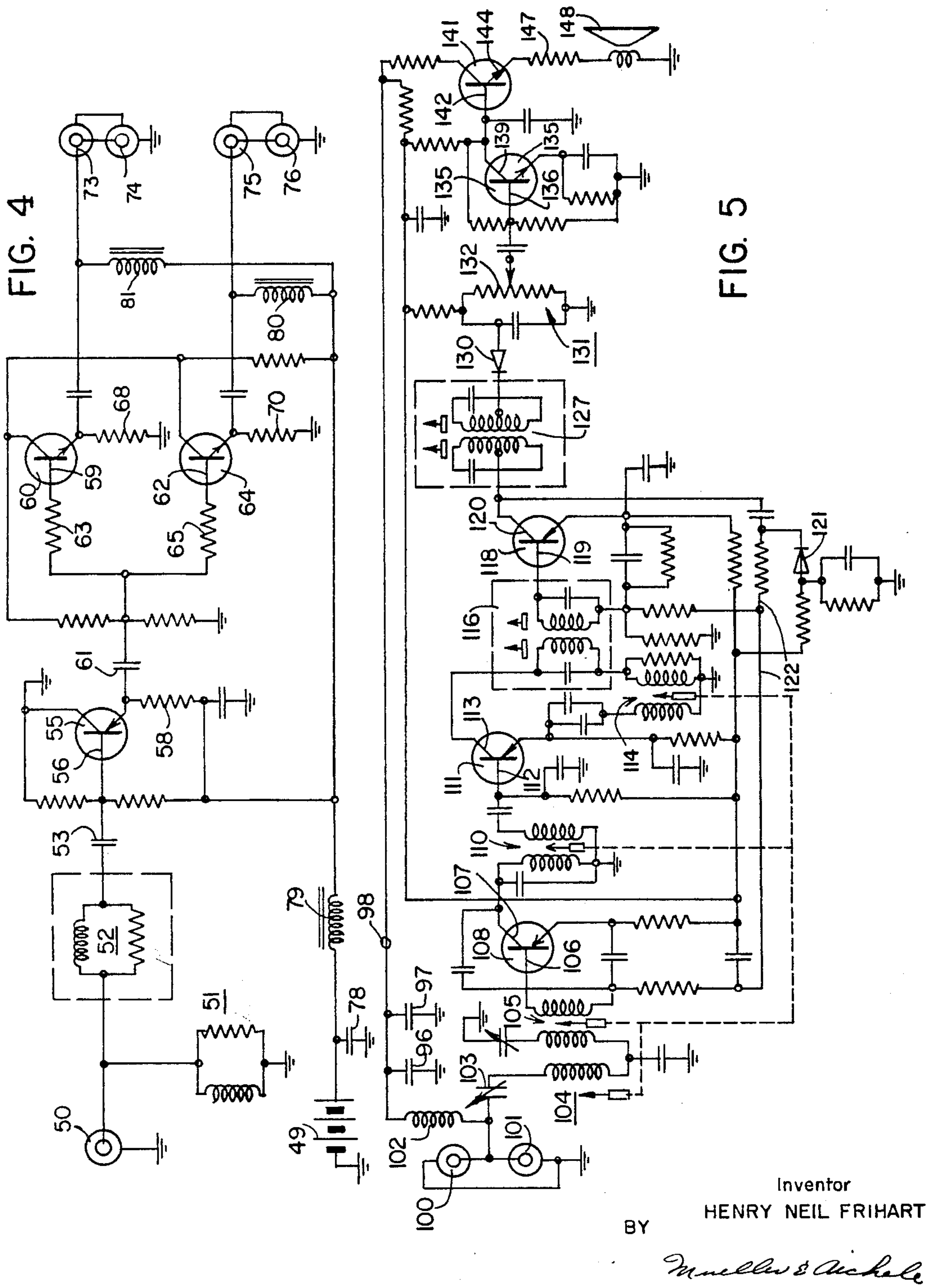
FIG. 4 is a schematic diagram of the distribution amplifier.
FIG. 5 is a schematic diagram of a radio receiver used in the system.

A schematic diagram of the distribution amplifier is shown in FIG. 4. The antenna 11 of FIGS. 1 and 2 is coupled to input terminal 50 of the distribution amplifier. Terminal 50 is coupled to base 56 of transistor 55 through circuits 51 and 52 and coupling capacitor 53. Circuits 51 and 52 act as a bandpass filter to select a desired band of frequencies, in this example the standard AM broadcast band.

Radio signals in the band of frequencies selected are amplified by transistor 55 and are coupled to base 59 of transistor 60 and base 62 of transistor 64 through resistors 63 and 65 and capacitor 61. Transistors 60 and 64 amplify the radio signals and the output signals therefrom appear across resistors 68 and 70 respectively. The radio signals appearing across resistor 68 are coupled to output terminals 73 and 74 while the radio signals appearing across resistor 70 are coupled to output terminals 75 and 76.

Power for the operation of the distribution amplifier is furnished by power supply 49 which may be the battery of the bus in which the system is installed. The output voltage is filtered by capacitor 78 and choke 79 and distributed to the desired portion of the distribution amplifier for use therein. The power supply is also coupled to the terminals 73, 74, 75 and 76 through chokes 80 and 81. Chokes 80 and 81 allow the current from the power supply to be coupled to the transmission lines while preventing the radio frequency current from flowing back to the power supply. Thus, both the radio frequency signals and power supply voltages are present at terminals 73, 74, 75 and 76.

A radio receiver used to tune signals of the desired frequency in the band of frequencies selected by the distribution amplifier is shown in FIG. 5. A distribution cable from the distribution amplifier, or from another radio receiver is coupled to input terminal 100. Output terminal 101 is coupled to input terminal 100 and may be connected to another receiver by a distribution cable. A portion of the direct current in the distribution cable connected to terminal 100 is coupled to cable 98 through choke 102 and is distributed to desired portions of the radio to provide power therefor. Radio frequency signals are blocked by the choke and filtered by capacitors 96 and 97. The power supply current is prevented from entering the radio frequency portion of the receiver by capacitor 103.

The radio signals are coupled to base 106 of transistor 108 by tuned circuits 104 and 105. Transistor 108 acts as a radio frequency amplifier, amplifying the selected frequencies in the band of radio frequency signals. The frequencies to be amplified are selected by tuned circuits 104 and 105. The amplified signal is coupled from collector 107 to base 112 of transistor 111 through tuned circuit 110 which is tuned to the same frequency as tuned circuits 104 and 105. Transistor 111 together with tuned circuit 114 acts as a converter and local oscillator converting the input radio frequency signals selected by tuned circuits 104, 105 and 110 to an intermediate frequency signal. The intermediate frequency signals are coupled from collector 113 to base 119 of transistor 118 through intermediate frequency transformer 116. An AGC signal for the radio is provided by AGC detector diode 121, the output of which is coupled back to the radio frequency and intermediate frequency stages through line 122. The output from intermediate frequency amplifier transistor 118 is coupled from collector 120 to IF transformer 127.

The output of IF transformer 127 is detected by detector diode 130 and coupled to base 136 of transistor 135 through the volume control resistor 132. The output of transistor 135 is coupled from collector 139 to the base 142 of transistor 141. The output signal from emitter 144 of transistor 141 is coupled to transducer 148 through resistor 147. Transducer 148 includes a sound coupler (36 of FIGS. 3, 6 and 7) which restricts the dispersion of the sound from transducer 148. Thus the audio sound signal developed by transducer 148 is not audible to persons in the vicinity of the radio receiver except through special sound tube earphones which will be described in a subsequent portion of the specification.

One problem involved in the operation of a plurality of radio receivers from a single transmission line is the mutual interference between receivers, caused by local oscillator signals being fed back to the transmission lines, and from there to other receivers. In the receiver shown in FIG. 5 tuned circuits 104, 105 and 110 act to attenuate the local oscillator signal to prevent its being coupled back to terminals 100 and 101 where it will enter the transmission lines coupled thereto. In addition, the impedance match between the input circuit of the radio receiver and the transmission line is deliberately mismatched to attenuate signals coupled therebetween. While the mismatch acts to attenuate the desired signals coupled from the transmission line to the radio these signals are strong enough so that a sufficiently strong signal is picked up by the radio for proper operation. However, the weak local oscillator signal is attenuated by tuned circuits 104, 105 and 110 and the impedance mismatch, and thus is not coupled back to the transmission line in sufficient strength to cause interference in other receivers. Also to minimize interference the number of receivers coupled to each transmission line is reduced by using four lines.

Figure 6:
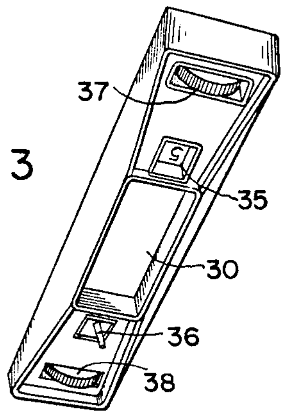
FIG. 6 is a view of a radio receiver showing the location of the controls.

An enlarged view of receiver 30 is shown in FIG. 6. Receiver 30 includes a station selector or tuning knob 37, which operates to tune receiver 30 to receive signals at a desired frequency in the broadcast band. A dial 35 indicates the portion of the band to which receiver 30 is tuned. Volume control 38 operates to regulate the volume of sound heard by the listener. Sound coupler 36 develops a sound signal which can be heard by the listener through sound tube earphones.

FIG. 7 illustrates sound tube earphones 34 which are used in this invention together with transducer 148. Transducer 148 includes a loudspeaker 39 which produces a sound signal and sound coupler 36 which couples the sound signal from loudspeaker 39 to the outside of the receiver in such a manner that the sound is inaudible to persons nearby. Sound tube earphones 34 consist of a flexible plastic tube 160, which is inserted over sound coupler 36. Sound traveling down the plastic tube 160 is coupled to a pair of rigid plastic tubes 162 shaped to be positioned at each ear of the listener. Ear pieces 164 are placed over rigid plastic tubing 162. Ear cushions 165 cover ear pieces 164 so that the earphones will fit the listener comfortably and extraneous sounds will be prevented from reaching the ear. The sound tube earphones 34 couple the sound signals from sound coupler 36 to the listener's ear so that it is clearly audible.

Thus, a radio entertainment system for a passenger vehicle has been described, which provides for privacy in listening by the use of individual earphones. The earphones used are manufactured from inexpensive plastic materials so that they can be disposed of after use eliminating sanitation problems and can provide a simple method of charging for the service. The radio programs are coupled to individual receivers so that the listener may select his own program and control his volume independently of other listeners. The individual receivers are designed to be installed in presently used vehicles and to operate with a minimum of mutual interference.

I claim:

1. A radio receiving system, including in combination, antenna means for receiving radio signals, a plurality of radio receivers, distribution amplifier means including filter circuit means for selecting a particular frequency band of said radio signals, said distribution amplifier means coupling said antenna means to each of said plurality of radio receivers to distribute said band of radio signals thereto, each of said plurality of radio receivers including tuning means for selecting desired frequencies from said band of signals, circuit means and transducer means coupled to said tuning means for converting said desired frequencies to sound signals, and sound tube earphone means coupled to said transducer means for transmitting said sound signals to an individual listener.

2. A radio receiving system, including in combination, antenna means for receiving radio signals, a plurality of radio receivers each having input circuit means, distribution amplifier means including filter circut means for selecting a particular frequency band of said radio signals coupled to said antenna means, distributing circuit means coupling said distribution amplifier means to each of said input circuit means to distribute said band of radio signals thereto, said distributing circuit means and said input circuit means having a substantial impedance mismatch therebetween whereby energy transferred between said input circuit means and said distributing circuit means is attenuated, each of said plurality of radio receivers including circuit means and transducer means for converting particular frequencies in said band of radio signals coupled thereto to sound signals, and sound transmission means coupled to said transducer means for transmitting said sound signals to an individual listener.

3. A radio receiving system, including in combination, antenna means for receiving radio signals, a plurality of radio receivers each having converter circuit means, input circuit means and tuned circuit means coupling said input circuit means to said converter circuit means, distribution amplifier means including bandpass filter means for selecting a particular frequency band of said radio signals coupled to said antenna means, distributing circuit means coupling said distribution amplifier means to each of said input circuit means to distribute said band of radio signals thereto, said distributing circuit means and said input circuit means having a substantial impedance mismatch therebetween whereby energy transferred between said input circuit means and said distributing circuit means is attenuated, said converter circuit means including local oscillator means for generating a local oscillator signals, said tuned circuit means acting to select desired frequencies from said band of signals and to attenuate said local oscillator signals, said tuned circuit means and said impedance mismatch acting to minimize coupling of said local oscillator signals to said distributing circuit means so as to reduce mutual interference between said plurality of receivers.

4. A radio receiving system, including in combination, antenna means for receiving radio signals, a plurality of radio receivers each having converter circuit means, input circuit means and tuned circuit means coupling said input circuit means to said converter circuit means, distribution amplifier means including bandpass filter means for selecting a particular frequency band of said radio signals coupled to said antenna means, distributing circuit means coupling said distribution amplifier means to each of said input circuit means to distribute said band of radio signals thereto, said distributing circuit means and said input circuit means having a substantial impedance mismatch therebetween whereby energy transferred between said input circuit means and said distributing circuit means is attenuated, said converter circuit means including local oscillator means for generating a local oscillator signal, said tuned circuit means acting to select desired frequencies from said band of signals, and to attenuate said local oscillator signals, said tuned circuit means and said impedance mismatch acting to minimize coupling of said local oscillator signals to said distributing circuit means so as to reduce mutual interference between said plurality of receivers, each of said plurality of radio receivers including translating circuit means and transducer means coupled to said converter means for converting said desired frequencies to sound signals, and sound transmission means coupled to said transducer means for transmitting said sound signals to an individual listener.

5. A radio receiving system, including in combination, a power supply, antenna means for receiving radio signals, a plurality of radio receivers, each including input circuit means, distribution amplifier means including filter circuit means for selecting a particular frequency band of said radio signals coupled to said antenna means, said distribution amplifier means being further coupled to said power supply for receiving a current therefrom, distributing circuit means coupling said distribution amplifier means to each of said plurality of radio receivers to distribute said band of radio signals and said current thereto, said input circuit means including current separation means for separating said current from said band of radio signals and applying said current to said radio receiver for use thereby, each of said plurality of radio receivers including circuit means and transducer means for converting particular frequencies in said band of radio signals coupled thereto to sound signals, and sound transmission means coupled to said transducer means for transmitting said sound signals to an individual listener.

6. The radio receiving system of claim 5 wherein, said radio receiving system is located within a passenger vehicle including a plurality of seats with an overhead structure extending over said seats, said plurality of radio receivers being mounted in said overhead structure with a separate receiver mounted over each of said seats.

7. A radio receiving system, including in combination, a power supply, antenna means for receiving radio signals, a plurality of radio receivers each having converter circuit means, input circuit means and tuned circuit means coupling said input circuit means to said converter circuit means, distribution amplifier means including bandpass filter means for selecting a particular frequency band of said radio signals coupled to said antenna means, said distribution amplifier means being further coupled to said power supply for receiving a current therefrom, distributing circuit means coupling said distribution amplifier means to each of said input circuit means to distribute said band of radio signals and said current thereto, said input circuit means including current separation means for separating said current from said radio signals and applying said current to said radio receiver for use thereby, said distributing circuit means and said input circuit means having a substantial impedance mismatch therebetween whereby radio frequency energy transferred between said input circuit means and said distributing circuit means is attenuated, said converter circuit means including local oscillator means for generating a local oscillator signal, said tuned circuit means further acting to select desired frequencies from said band of signals and to attenuate said local oscillator signals, said tuned circuit means and said impedance mismatch acting to minimize coupling of said local oscillator signals to said distributing circuit means so as to reduce mutual interference between said plurality of receivers, each of said plurality of radio receivers including translating circuit means and transducer means coupled to said converter means for converting said desired frequencies to sound signals, and sound transmission means coupled to said transducer means for transmitting said sound signals to an individual listener.

8. A radio receiving system including in combination, antenna means for receiving radio signals, distribution amplifier means including filter circuit means for selecting a particular band of said radio signals and amplifying means for amplifying said band of radio signals, a power supply coupled to said distribution amplifier means for providing a first current therefor, output terminal means coupled to said amplifying means, first inductance means coupling said power supply to said output terminal means for providing a second current thereto, a plurality of radio receivers each having input circuit means, converter means, intermediate frequency amplifier means, detector means, transducer means, and tuned circuit means coupling said input circuit means to said converter means for selecting particular frequencies from said band of radio signals, cable means coupling each of said radio receivers to said output terminals whereby said band of radio signals and said second current are coupled to each of said input circuit means, said input circuit means including second inductance means for separating said second current from said radio signals and applying said second current to said radio receiver for use thereby, said cable means and said input circuit means having a substantial impedance mismatch therebetween whereby energy transferred between said input circuit means and said distributing circuit means is attenuated, said converter circuit means including local oscillator means for generating a local oscillator signal, said tuned circuit means acting to attenuate said local oscillator signals, said tuned circuit means and said impedance mismatch acting to minimize coupling of said local oscillator signals to said distributing circuit means so as to reduce mutual interference between said plurality of receivers, said converter means, said intermediate frequency amplifier means and said detector means acting to develop electrical signals representative of sound signals from said selected particular frequencies, said transducer means being responsive to said electrical signals to develop sound signals therefrom, sound tube earphone means coupled to said transducer means for transmitting said sound signals to an individual listener.

9. A radio receiving system for a passenger vehicle having a plurality of seats and an area over each seat adapted to mount radio receivers, antenna means on the vehicle for receiving radio signals, a plurality of radio receivers each mounted in said overhead area, distribution amplifier means including filter circuit means for selecting a particular frequency band of said radio signals, said distribution amplifier means coupling said antenna means to each of said plurality of radio receivers to distribute said band of radio signals thereto, each of said plurality of radio receivers including tuning means for selecting desired frequencies from said band of signals, circuit means and transducer means coupled to said tuning means for converting a selected radio signal to an audio signal, said transducer means having a sound coupler limiting general dispersion of sound so that the sound signals are inaudible to persons seated in said seats, earphone means coupled to said sound coupler for transmitting said sound signals to an individual listener, said earphone means including sound carrying tubes adapted for positioning adjacent the ears of a listener and a flexible sound tube coupling said sound coupler means to said sound carrying tubes.

References Cited

UNITED STATES PATENTS

| | | | |
|---|---|---|---|
| 1,968,099 | 7/1934 | Shumard | 325—308 |
| 2,006,994 | 7/1935 | Hopkins | 325—301 |
| 2,094,360 | 9/1937 | Landon | 325—308 XR |
| 2,229,043 | 1/1941 | Butler | 325—308 XR |
| 3,187,259 | 6/1965 | Scandurra et al. | 325—308 |

KATHLEEN H. CLAFFY, *Primary Examiner.*

R. S. BELL, *Assistant Examiner.*